United States Patent [19]

Robbins et al.

[11] 4,002,603
[45] Jan. 11, 1977

[54] POLYVALENT METAL SALTS OF 7-HYDROXY-8-[p-(PHENYLAZO)-PHENYLAZO]-1,3-NAPHTHALENEDISULFONIC ACID FOR DYEING FIBERGLASS

[75] Inventors: Woodrow Wilson Robbins, Bound Brook; Herbert Soffer, Fanwood; Richard Benjamin Balsley, Lebanon, all of N.J.

[73] Assignee: American Cyanamid Company, Stamford, Conn.

[22] Filed: Aug. 28, 1974

[21] Appl. No.: 501,301

[52] U.S. Cl. .............................. 260/148; 260/177; 260/178; 260/184; 260/191; 260/208; 8/85 R
[51] Int. Cl.² ............... C09B 45/24; C09B 31/02; D06P 3/80
[58] Field of Search .......... 260/148, 191, 177, 184, 260/195, 150

[56] References Cited

UNITED STATES PATENTS

| 233,465 | 10/1880 | Baum | 260/191 |
|---|---|---|---|
| 314,939 | 3/1885 | Hoffmann | 260/191 |
| 695,811 | 3/1902 | Julius et al. | 260/195 |
| 2,981,729 | 4/1961 | Kesler et al. | 260/191 |
| 3,574,182 | 4/1971 | Jones | 260/195 |

*Primary Examiner*—Floyd D. Higel
*Assistant Examiner*—John J. Doll
*Attorney, Agent, or Firm*—John L. Sullivan

[57] ABSTRACT

Dyes of the formula:

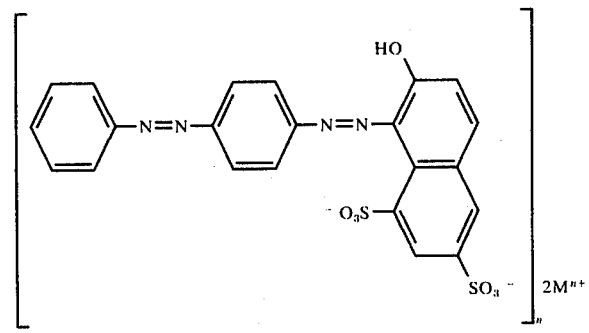

wherein M is a metal selected from the group consisting of calcium, barium, strontium, magnesium, chromium, manganese, iron, cobalt, nickel, copper, and zinc and wherein n is an integer selected from 2 and 3 are superior dyes for the dyeing of fiberglass in that they are resistant to crystal growth in dye pastes and recycle process water in the dyeing of fiberglass thus, in the spray dyeing of the fiberglass the dyes do not tend to clog the nozzle of the spraying device as do the corresponding salts of monovalent metals, such as the disodium and dipotassium salts.

4 Claims, No Drawings

POLYVALENT METAL SALTS OF 7-HYDROXY-8-[P-(PHENYLAZO)PHENYLAZO]-1,3-NAPHTHALENEDISULFONIC ACID FOR DYEING FIBERGLASS

This invention relates to novel dyes having the formula:

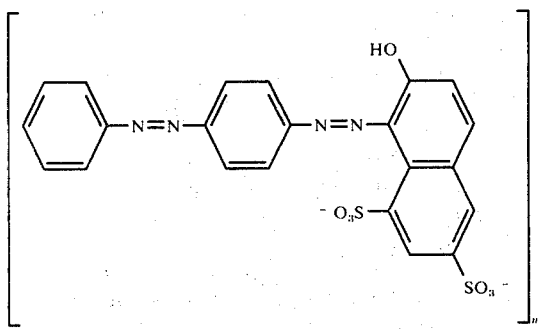

wherein M is a metal selected from the group consisting of calcium, barium, strontium, magnesium, chromium, manganese, iron, cobalt, nickel, copper, and zinc and wherein n is an integer selected from 2 and 3. Still further, this invention relates to compositions containing said dyes for the dyeing of fiberglass.

The disodium salt of 7-hydroxy-8-[p-(phenylazo)-phenylazo]-1,3-naphthalenedisulfonic acid has been sold for many years under the designation Acid Red 73, Color Index 27,290. The dipotassium salt of the same acid is disclosed by Kesler et al, in U.S. Pat. No. 2,981,729. Unfortunately, in the presence of recycle process water, i.e., moderately hard water used in the dyeing of fiberglass, the disodium and dipotassium salts convert to larger crystals which clog the orifices of dye spraying devices. Another disadvantage of the disodium and dipotassium salts is the fact that they have only fair resistance to crystal growth when stored as a paste.

We have found that the aforementioned deficiencies in the disodium and dipotassium salts can be overcome by using the novel dye compounds of this invention. We have found that the novel dye compounds of this invention are resistant to crystal growth on storage as a paste and in contact with recycle process water.

Another advantage of the dicalcium salt over the disodium salt is the fact that the former can be formulated into a more fluid paste.

The compounds are prepared by coupling a diazo solution of p-aminoazobenzene with the disodium salt of 7-hydroxy-1,3-naphthalenedisulfonic acid, hereinafter referred to as "G-Salt," and subsequently heating the coupled product in water in the presence of the appropriate metal salt.

The diazo solution is prepared by addding either p-aminoazobenzene per se to water containing hydrochloric acid, or p-aminoazobenzene hydrochloride to water, to form a slurry at about pH one. The slurry is cooled to about 12°–16° C. and from 1.0 to 1.2 moles of sodium nitrite is added per mole of p-aminoazobenzene while keeping the temperature at about 12°–16° C. When diazotization is completed, the solution is clarified. A filter aid may be stirred into the mixture prior to clarification if so desired, A separate solution of G-salt is prepared by dissolving from 1.0 to 1.2 moles of G-salt per mole of p-aminoazobenzene used in the preparation of the diazo solution in water at about 50° C. The pH of the solution is then adjusted to about 2.5 to 5.0, preferably about 2.7 to 3.3, by the addition of small amounts of sodium hydroxide or hydrochloric acid. The G-salt may be used per se or it may be further admixed with sodium chloride, preferably it is mixed with the latter and the temperature is lowered to about 0°–5° C.

Coupling is carried out by rapidly adding clarified p-aminoazobenzenediazo solution to the G-salt solution while stirring and maintaining the temperature at about 0°–5° C. The pH of the reaction is adjusted to above about seven, preferably to about 9, by adding an aqueous solution of sodium carbonate. Coupling is continued until a qualitative test for excess diazo is negative.

To the reaction mixture is then added about two moles of the appropriate metal halide per mole of G-salt used. The reaction mixture is heated from about 50° to about 100° C., and held at about 50° to about 100° for about one hour, then filtered to separate the solid. The filter cake is then pressed to remove as much water as possible. The product, the dimetallic salt of 7-hydroxy-8-[p-(phenylazo)phenylazo]-1,3-naphthalenedisulfonic acid represents about 40 to 60 percent by weight of the filter cake.

The final product is formulated into a paste by ball-milling it with urea, a dispersing agent, an antifoaming agent and a biostat in water until a 2.5 gram sample of the paste when added to 250 ml. of water at 48°–50° C. can be filtered through an Eaton-Kikeman No. 048 filter paper superimposed over a Whatman No. 4 filter paper on an 11 cm. Buchner funnel within one minute, with only a trace of residue on the paper, when a vacuum of 27 to 29 inches is applied to the system. (This usually requires ball-milling for at least 8 hours.) At this point, the paste is adjusted to the desired final solids content and viscosity by adding water and a thickening agent, preferably carboxymethylcellulose.

The adjusted paste is then ball-milled for an additional period (1 to several hours) and discharged through a 200 mesh screen. The solids content of the final paste is about 27 to 30% by weight.

A dye paste of 100 parts by weight broadly comprises the following in parts by weight: from about 20 to about 35 parts of real dye, from about 0.5 to about 2.0 parts of urea, from about 0.1 to about 2.0 parts of a dispersing agent, from about 0.02 to about 0.2 part of an antifoam agent, from about zero to about 1.5 parts of thickener, and from about 0.01 to about 0.1 part of a biocide, with the remainder being water. Preferably 100 parts by weight of dye paste comprises the following in parts by weight: from about 25 to about 30 parts of real dye, from about 0.75 to about 1.5 parts of urea, from about 0.25 to about 0.75 part of dispersing agent, from about 0.75 to about 1.25 parts of thickener and from about 0.025 to about 0.075 part of a biocide, with the remainder being water.

A typical paste formulation is as follows:

| Materials | Parts |
| --- | --- |
| Real dye | 30.50 |
| Urea | 2.00 |
| Marasperse CB (a) | 0.50 |
| Antifoam DB-31 (b) | 0.10 |
| Giv Gard DXN (c) | 0.05 |
| CMC-70 (low) (d) | 1.00 |

| Materials | Parts |
|---|---|
| Water | 65.85 |

(a) Marasperse CB (American Can Co.) is an anionic dispersant, sodium lignosulfonate.
(b) Antifoam DB-31 (Dow Corning) is a silicone emulsion.
(c) Giv Gard DXN (Givaudan Corp.) is a biocide, 6-acetoxy-2,4-dimethyl-m-dioxane.
(d) CMC-70 (low) is a thickening agent, carboxymethyl cellulose.

The present invention will be more fully illustrated in conjunction with the following examples which are intended for that purpose. Except as otherwise noted, all parts are by weight and temperatures are in degrees centigrade.

EXAMPLE 1

This example illustrates the preparation of the dicalcium salt of 7-hydroxy-8-[p-(phenylazo)phenylazo]-1,3-naphthalenedisulfonic acid from the disodium salt.

To a suitable reaction vessel is added 3500 ml. of a solution containing 120 g. (0.21 mole) of the disodium salt of 7-hydroxy-8-[p-(phenylazo)phenylazo]-1,3-naphthalenedisulfonic acid prepared by the procedure of Example 1 of U.S. Pat. No. 2,981,729. The pH of the solution is adjusted to 10.0 by the addition of 50% sodium hydroxide solution, the solution is heated to 60° C. over 25 minutes, 300 g. (2.16 moles) of 77–80% real calcium chloride is added, and the temperature is then adjusted to 80°–90° C. The mixture is stirred for one-half hour at 80°–90° C., then cooled to 70° C. over one-fourth hour and filtered at 70° C. The filter cake weighs 147 g. and has a solids content of 52.2%.

EXAMPLE 2

A dye paste is prepared by ball-milling the following mixture for 18 hours:

| Materials | Parts by Weight |
|---|---|
| Filter cake from Example 1 | 130.5 (68.1 parts real) |
| Urea | 2.5 |
| Marasperse CB | 5.0 |
| Giv Gard DXN | 0.2 |
| Antifoam DB-31 | 0.1 |
| Water | 82.0 |

At the end of this period, microscopic examination shows most particles to be 2–3 microns long. To the mixture is charged 1.25 g. of CMC-70 (low) and 29.0 g. of water and milling is continued for an additional 4 hours. At the end of this period, the paste has a viscosity of 285 cps.

Crystallization Resistance of Paste

A one ounce bottle is half-filled with the product of Example 2, fitted with a loose cap and placed in an oven at 80° C. until the temperature of the paste approaches 80° C. The cap is then tightened and the bottle is maintained at 80° C. After 7 days at 80° C., a microscopic examination of the paste shows no evidence of crystal growth.

EXAMPLE 3

This example illustrates the preparation of the dicalcium salt of 7-hydroxy-8-[p-(phenylazo)phenylazo]-1,3-naphthalenedisulfonic acid in situ.

A diazo solution is prepared by adding 11.1 ml. of 20° Be hydrochloric acid and 45.0 (0.228 mole) of p-aminoazobenzene to 260 ml. of water, stirring and diluting to a volume of 860 ml. To the mixture is added 18.5 ml. of 20° Be hydrochloric acid and the temperature is lowered to 12°–16° C. by external cooling. To the mixture is added 53.3 ml. of a 25% aqueous solution of sodium nitrite (0.228 mole) and the reaction mixture is stirred at 12°–16° C. for 30 minutes. An additional 6.3 ml. of 25% aqueous sodium nitrite (0.027 mole) is then added and stirring is continued at 12°–16° C. for one hour. The temperature is then lowered to 0°–5° C.

A solution of G-salt is prepared by adding 86.2 g. (0.247 mole) of the disodium salt of 7-hydroxy-1,3-naphthalenedisulfonic acid to 637 ml. of water at 30°–35° C., stirring and heating at 50°–55° C. The pH is then adjusted to 2.7–3.3 by the addition of caustic soda and 75.0 g. of sodium chloride is then added. The mixture is then stirred until dissolution occurs and the temperature is then lowered to 0°–5° C. by cooling.

Coupling is carried out by adding the diazo solution to the G-salt rapidly. To the solution is then added 1.125 g. of Surfonic N-95 (Jefferson Chemical Company, Inc., Houston, Texas) at 0°–5° C. Without delay, a solution of sodium carbonate (45.0 g. of soda ash dissolved in 158 ml. of water at 40° C., diluted to a volume of 338 ml. at 5°–10° C. by adding cold water) is added to adjust the pH to 8.9–9.1 and the mixture is stirred at 0°–5° C. for 5 hours. The mixture is then heated to 55°–65° C. while adding 53.3 ml. of 20° Be hydrochloric acid thereto to adjust the pH to 6.2 to 6.8. The solution is then adjusted to pH 8.0–9.0 by adding 4.5 ml. of 24% aqueous sodium hydroxide, 120.0 g. (0.85 mole) of calcium chloride (77–80% real) is added over a period of about 30 minutes and the mixture is filtered at 55°–60° C. The filter cake contains about 57.5% solids.

EXAMPLE 4

This example illustrates the preparation of the dibarium salt of 7-hydroxy-8-[p-(phenylazo)-phenylazo]-1,3-naphthalenedisulfonic acid in situ.

The procedure of Example 3 is used except that 122 grams (0.5 mole) of barium chloride is added instead of calcium chloride. The filter cake contains about 44.9% real dye solids.

EXAMPLE 5

This example illustrates the preparation of the diiron salt of 7-hydroxy-8-[p-(phenylazo)phenylazo]-1,3-naphthalenedisulfonic acid in situ.

The procedure of Example 3 is used except that 139 grams (0.5 mole) of $FeSO_4 \cdot 7H_2O$ is added instead of calcium chloride. The filter cake contains about 75% real dye solids.

EXAMPLE 6

This example illustrates the preparation of the dicopper salt of 7-hydroxy-8-[p-(phenylazo)phenylazo]-1,3-naphthalenedisulfonic acid in situ.

The procedure of Example 3 is used except that 67.2 grams (0.5 mole) of cupric chloride is added instead of calcium chloride. The filter cake contains about 41% real dye solids.

EXAMPLES 7-9

These examples show the preparation of dye pastes with the products of Examples 4, 5 and 6, respectively.

Dye pastes are prepared according to the method of Example 2 by ball-milling the following materials:

| Materials | Parts Per 100 Parts by Weight of Paste | | |
|---|---|---|---|
| | Example 7 | Example 8 | Example 9 |
| Real dye | 26.00 | 26.00 | 26.00 |
| Urea | 2.00 | 2.00 | 2.00 |
| Marasperse CB | 0.50 | 0.50 | 0.50 |
| Antifoam DB-31 | 0.10 | 0.10 | 0.10 |
| Giv Gard DXN | 0.05 | 0.05 | 0.05 |
| CMC-70 low | 1.00 | — | — |
| Water | 70.35 | 71.35 | 71.35 |

The crystallization resistance on aging at 80° C. is rated good for each of the above-described pastes. There is no evidence of crystal growth on aging.

Each of the above-described pastes has good resistance to crystal growth when dispersed and stored in recycle process water.

EXAMPLES 10-13

These examples show the dyeing of fiberglass batting with the products of Examples 2, 7, 8 and 9, respectively.

Samples of dye pastes of Examples 2, 7, 8 and 9 are dispersed in separate aqueous solutions of a urea phenolformaldehyde resin and the mixtures are sprayed separately onto fiberglass battings. The battings are then heated for 3 minutes at 450° F. in order to cure the resin. The treated battings are dyed as follows:

| Example | Color of Dyeing |
|---|---|
| 10 | red |
| 17 | red |
| 12 | red |
| 13 | red |

We claim:
1. A dye represented by the following formula:

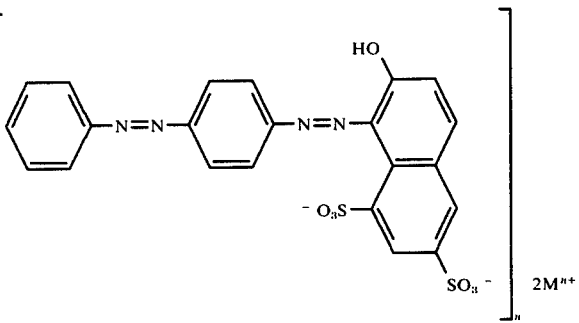

wherein M is selected from the group consisting of calcium, barium, strontium, magnesium, chromium, manganese, iron, cobalt, nickel, copper and zinc and wherein $n$ is an integer selected from 2 and 3.

2. A dye of claim 1 wherein M is calcium.
3. A dye of claim 1 wherein M is barium.
4. A dye of claim 1 wherein M is copper.

* * * * *